RESETTABLE DELAY FLOP UTILIZING CAPACITOR IN FEEDBACK CIRCUIT

Filed Sept. 14, 1959 2 Sheets-Sheet 1

INVENTOR.
ERNESTO G. SEVILLA

William G. Miller Jr.
AGENT

July 9, 1963 E. G. SEVILLA 3,097,310

RESETTABLE DELAY FLOP UTILIZING CAPACITOR IN FEEDBACK CIRCUIT

Filed Sept. 14, 1959 2 Sheets-Sheet 2

*INVENTOR.*
ERNESTO G. SEVILLA

William G. Miller Jr.

*AGENT*

United States Patent Office 3,097,310
Patented July 9, 1963

3,097,310

RESETTABLE DELAY FLOP UTILIZING CAPACITOR IN FEEDBACK CIRCUIT

Ernesto Guidote Sevilla, Philadelphia, Pa., assignor to Sperry Rand Corporation, New York, N.Y., a corporation of Delaware Filed Sept. 14, 1959, Ser. No. 839,941
6 Claims. (Cl. 307—88.5)

The present invention relates to "delay flops." A delay flop is a desirable element in certain computer circuits and is a device which upon recepit of an input signal produces an output signal of predetermined length, usually longer than, or delayed in time with respect to, said input signal, or one having a predetermined number of pulses.

A resettable delay flop is one in which the device will respond to a second input signal which arrives before the output, due to the first input signal, ceases. A non-reset table delay flop is one in which the device will not respond to a second input signal which arrives before the output, due to the first input signal, ceases. For example, in the case of a resettable delay flop a given input signal will produce an output that continues for a predetermined time period following receipt of the input signal. A second input signal, received at the input prior to the expiration of the predetermined time period will cause the output to continue for a similar predetermined time period following the second input signal. In a non-resettable delay flop, such a second control signal would have no effect.

The present invention relates to a delay flop of the resettable type although in its broadest aspects the invention provides a delay flop which may be adapted to be either of the resettable type or of the type which is not resettable.

Delay flops known in the prior art frequently utilize a capacitor in a RC circuit to determine the length of the delay in the output. These circuits have generally required that the size of the capacitor be limited due to the nature of the circuit utilized for charging the capacitor and there has been, therefore, a necessary limitation upon the range over which it has been possible to alter the delay time by changing the magnitude of the capacity in the timing circuit. It is desirable in certain instances to have a delay flop circuit which is capable of having its delay period altered over a considerable range to make the circuit highly flexible.

In view of the foregoing, it is a primary object of this invention to provide an improved delay flop circuit.

It is a further object of this invention to provide an improved delay flop circuit capable of being easily adapted to provide a wide range of delays.

A further object of this invention is the provision of improved delay flop circuits which can be reset after a very short period.

Another object of this invention is the provision of a resettable delay flop which has improved flexibility and stability.

Still another object of this invention is the provision of an improved circuit for producing an output signal at a predetermined time after a group of periodic input signals have ceased.

In carrying out the above objects, this invention provides a delay flop having an input circuit and a capacitor connected to said input circuit so that the input circuit produces a charging current for the capacitor in response to either the presence of an input signal to the input circuit or the presence of a charging current in the cappacitor itself, whereby the charging of the capacitor may be initiated by an input signal and maintained by the charging current flow itself. There is also provided a discharge circuit for the capacitor which produces an output signal after the capacitor has been discharged to some predetermined potential.

The foregoing objects, advantages and novel features of this invention, both as to its organization and mode of operation, may be best understood from the following description when read in connection with the accompanying drawings, in which like reference numerals refer to like parts and in which.

Figure 1:
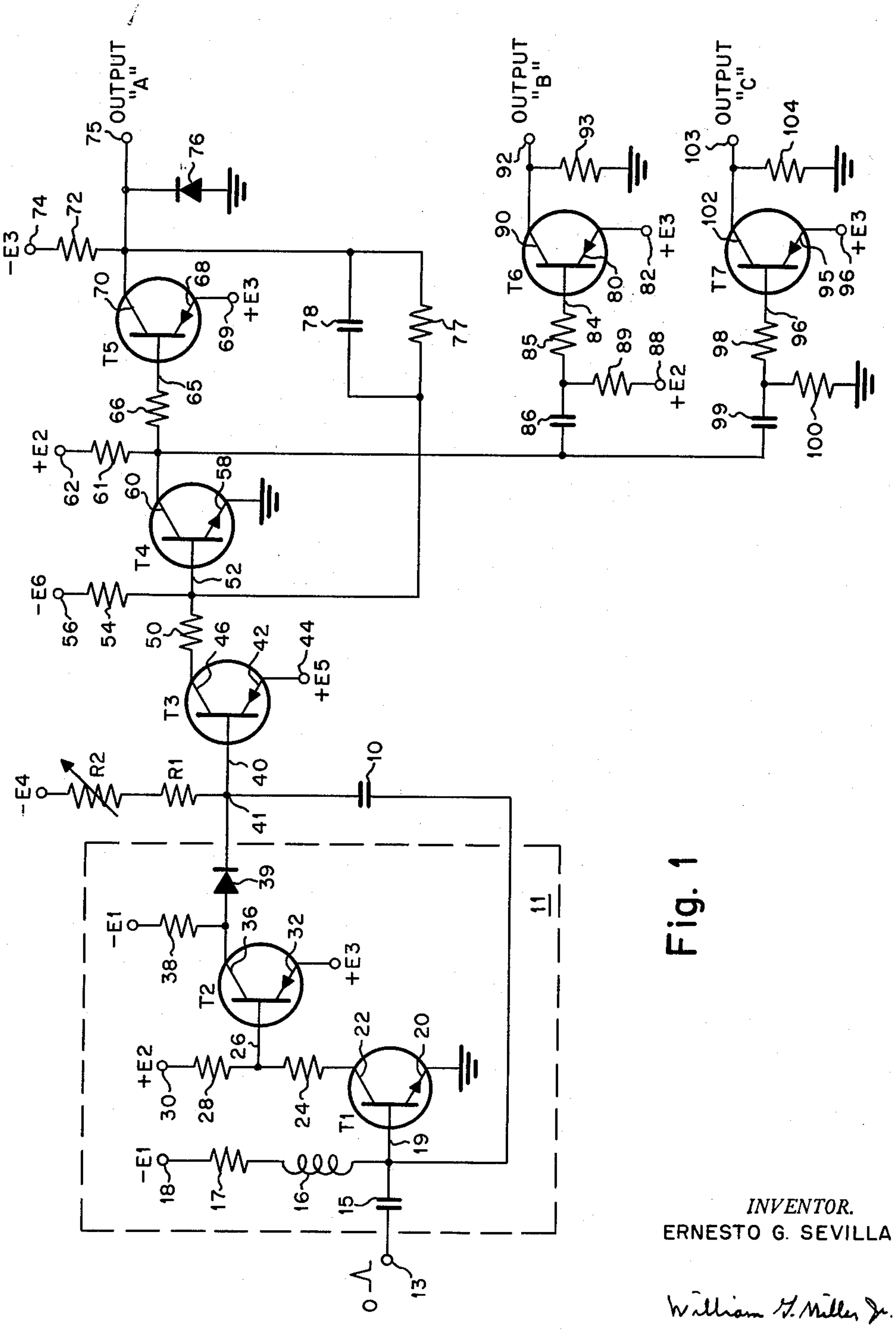
FIGURE 1 is a circuit diagram with a resettable delay flop capable of producing three different types of output signals.

One form of this invention is shown as the resettable delay flop circuit of FIGURE 1. This circuit includes the timing capacitor 10 which is connected to an input circuit 11. The input circuit 11 provides the charging current for the capacitor 10 in response to an input pulse at terminal 13. This terminal is connected to the input circuit 11 at the base 19 of transistor $T_1$. This connection is through an A.C. coupling including a capacitor 15 in series between the input terminal 13 and transistor $T_1$. The junction between the capacitor 15 and the transistor $T_1$ is connected through a series circuit including inductor 16 and resistor 17 to a source of negative potential $-E_1$ at terminal 18. The junction between the capacitor 15 and the transistor $T_1$ is also connected to one terminal of the timing capacitor 10.

Transistor $T_1$ is shown as an NPN type transistor whose base 19 is connected as previously described to input terminal 13. Transistor $T_1$ has its emitter 20 connected to ground and its collector 22 connected to a resistor 24 which is in turn connected to the base 26 of another transistor $T_2$. The connecting point between the resistor 24 and the base terminal 26 of transistor $T_2$ is also connected through resistor 28 to a source of positive bias potential $+E_2$ at terminal 30. The connection and bias potentials make transistor $T_1$ non-conductive in the absence of positive input signals at terminal 13.

The transistor $T_2$ is shown as being of PNP type with its emitter 32 connected to a source of positive bias potential $+E_3$ at terminal 34, which biases $T_2$ to be normally non-conductive.

The collector 36 of transistor $T_2$ is connected through resistor 38 to a source of negative bias potential $-E_1$. The collector 36 is also connected to the anode of diode 39 which has its cathode connected to the output terminal 41 of the input circuit 11. Terminal 41 is also connected to the side of the timing capacitor 10 opposite that connected to the base 19 of transistor $T_1$. Terminal 41 is also connected to a discharge circuit for timing capacitor 10 which comprises a series circuit including a fixed resistor $R_1$ and a variable resistor $R_2$ connected to a source of negative potential $-E_4$. Terminal 41 is further connected to the output circuit at its connection with the base 40 of transistor $T_3$.

The transistor $T_3$ is of the PNP type and has its emitter 42 connected to a source of positive bias potential at terminal 44, namely, $+E_5$.

The collector 46 of transistor $T_3$ is connected through resistor 50 to the base terminal 52 of transistor $T_4$. The connection between resistor 50 and the base terminal 52 is also connected through resistor 54 to a source of negative bias potential $-E_6$ at terminal 56. These connections provide bias potentials which maintain $T_3$ in the conducting state whenever $T_2$ is in a non-conducting state.

The transistor $T_4$ is of the NPN type and has its emitter 58 connected to ground and its collector 60 connected through resistor 61 to a source of positive bias potential $+E_2$ at terminal 62. Transistor $T_4$ will be conductive as long as transistor $T_3$ is conductive.

The collector 60 of transistor $T_4$ is connected to three different branches of the output circuit.

The first branch of the output circuit includes transistor $T_5$ which has its base 65 connected through resistor 66 to the collector 60. Transistor $T_5$ is of the PNP type and has its emitter 68 connected to a source of positive bias potential $+E_3$ at terminal 69 while the collector 70 is connected to a source of negative bias potential $-E_3$ at terminal 74. These bias potentials on transistor $T_5$ keep it normally in the conductive state so that a steady output potential of approximately $+E_3$ is produced as output "A" at terminal 75 in the absence of a change of transistor $T_4$ to a non-conductive state. The collector 70 is also connected through a feedback circuit including the parallel combination of resistor 77 and capacitor 78 to the base 52 of transistor $T_4$.

The output terminal 75 is also connected to the cathode of diode 76 which has its anode connected to ground to clamp the output terminal 75 to ground potential whenever the transistor $T_5$ is non-conductive.

The second branch of the output circuit coupled to the emitter 60 of transistor $T_4$ utilizes the PNP type transistor $T_6$ which has its emitter 80 biased at a positive potential $+E_3$ at terminal 82. The base 84 of transistor $T_6$ is connected through resistor 85 and capacitor 86 to the collector 60 of transistor $T_4$. There is also a connection at the junction between the resistor 85 and the capacitor 86 to a source of positive bias potential $+E_2$ at terminal 88. This connection is through resistor 89. Transistor $T_6$ is thus maintained nonconductive.

The collector 90 of transistor $T_6$ is connected to both the output terminal 92 and to the resistor 93 which is, in turn, connected to ground. Output "B" which will thus normally be zero potential appears at terminal 92.

The third branch of the output circuit utilizes the PNP type transistor $T_7$ having its emitter 95 connected to a source of positive bias potential $+E_3$ at terminal 96. The base 98 of transistor $T_7$ is connected in series circuit through resistor 98 and capacitor 99 to the emitter 60 of transistor $T_4$. The junction between the resistor 98 and the capacitor 99 is connected through resistor 100 to a ground connection. The collector 102 of transistor $T_7$ thus provides output "C" at output terminal 103. This output terminal is also connected to ground through resistor 104. These connections and bias potentials will maintain transistor $T_7$ normally conductive and output "C" at approximately $+E_3$.

Figure 2:
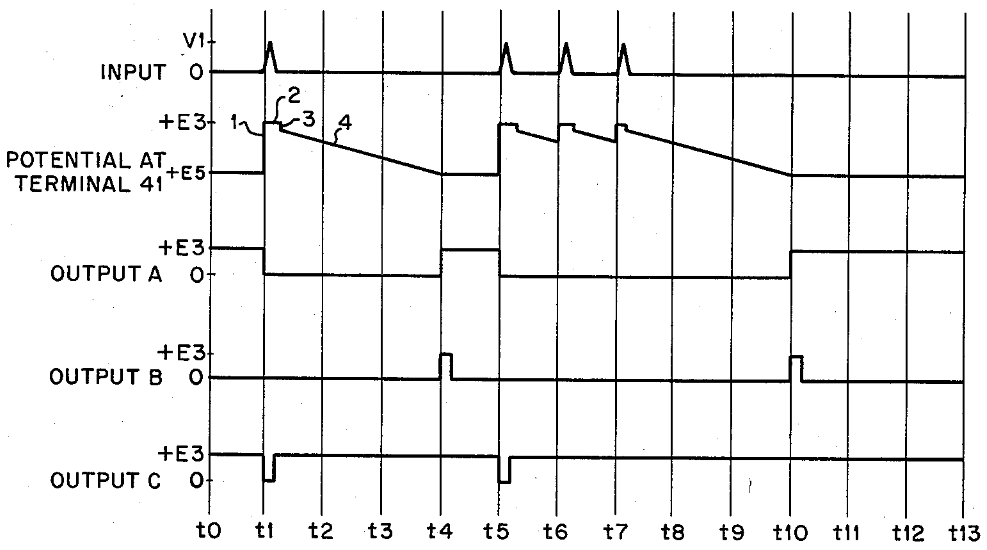
FIGURE 2 is a timing diagram showing the variation of potentials at several points in the circuit of FIGURE 1 in response to a series of input signals.

The operation of the resettable delay flop of FIGURE 1 in response to an input pulse will be evident from the following explanation of the circuit of FIGURE 1 and the timing diagrams of FIGURE 2.

In the absence of an input pulse at the input terminal 13, as during the time $t_0$–$t_1$ (FIGURE 2), the transistors $T_1$ and $T_2$ are in a normally off or non-conducting condition. This results from the various biasing voltages $E_1$, $E_2$ and $E_3$. In the absence of conduction in transistors $T_1$ and $T_2$, the biasing voltages affecting transistor $T_3$, namely, $E_3$, $E_4$, $E_5$ and $E_6$, will place it in a normally "on" or conducting state. Conduction in $T_3$ also produces conduction in $T_4$ as a result of the raising of the potential at base 52 due to collector current flow from collector 46 to terminal 56. Conduction in $T_3$ in turn produces the normally conducting state of transistor $T_5$ as a result of collector current flow in $T_4$ thus producing a steady state potential for output "A" at terminal 75.

The biases on the transistor $T_6$, $E_2$ and $E_3$, place it in a normally non-conductive state thus making output "B" at terminal 92 normally of zero potential.

The third output results from the normally conducting state of $T_7$ produced by the biases affecting it. This normally conducting state of $T_7$ provides a steady state output at output "C" on terminal 103 in the absence of any input pulse at terminal 13.

In response to an input pulse of short duration starting at time $t_1$ and applied at input terminal 13, the base 19 of transistor $T_1$ rises in potential as a result of the potential drop across inductor 16 and resistor 17 to bias $T_1$ to a conductive state. With transistor $T_1$ in a conducting state, current is drawn from the positive bias source $+E_2$ at terminal 30 through resistor 28, resistor 24 and transistor $T_1$. This current reduces the potential at base 26 of transistor $T_2$ sufficiently to place it in a conductive state also.

Part of the collector current of transistor $T_2$ flows through diode 39. This current flows to terminal 41 and provides the charging current flow through the timing capacitor 10 to the base 19 of transistor $T_1$ and thence through the emitter 20 of $T_1$ to ground. This flow of charging current serves to speed up the response of transistor $T_1$ and maintains it in a conducting state even after the input pulse at terminal 13 has ceased. The capacitor 10 thus continues to charge toward a potential approaching $+E_3$; as the terminal 41 nears the potential $+E_3$, charging current through diode 39 is substantially reduced. Consequently, the feedback to transistor $T_1$ terminates and conduction in both transistors $T_1$ and $T_2$ ceases. The charging of the capacitor 10 (through the low forward impedances of the diode 39 and the emitter-collector path of transistor $T_2$) may occur at a rapid rate as is illustrated in FIGURE 2 by the vertical line along the leading edge 1 of the potential waveform at terminal 41 at the time $t_1$. It should be noted that following the charging of the capacitor 10 the potential at terminal 41 continues at a constant value, $+E_3$, as shown by the plateau 2 of the waveform in FIGURE 2, for a short period of time. This results from the continued conduction of transistors $T_1$ and $T_2$ until the stored carriers in these transistors have been dissipated. For example, the base 19 of $T_1$ continues at substantially ground potential during the dissipation of stored carriers.

After the stored carriers of transistors $T_1$ and $T_2$ have been dissipated, the transistors $T_1$ and $T_2$ cease to conduct, and there is immediately a sharp drop in potential at terminal 41 shown at the trailing edge 3 of the waveform in FIGURE 2. This drop is a result of the negative bias at terminal 18 pulling down the potential of the base 19 and the lower terminal of the capacitor 10. After the potential at terminal 41 has gone through this sharp decrease following cut off of transistors $T_1$ and $T_2$, the potential at terminal 41 decreases as a result of the discharge of capacitor 10 through its discharging circuit, resistors $R_1$ and $R_2$. By making the bias potential $E_4$ a fairly negative potential, the discharging of the capacitor will cause the terminal 41 to follow a normal exponential curve which will roughly appear in this case to be a straight line, segment 4 of the waveform in FIGURE 2, since the capacitor is discharging toward $-E_4$ which provides a very large potential difference from the voltage to which the capacitor is charged. Thus, the capacitor 10 and the resistors $R_1$ and $R_2$ determine the length of time required for the terminal 41 to return to the potential which will cause the transistor $T_3$ to again conduct.

Briefly, the transistor $T_3$ ceases to conduct as a result of the rise in potential at the terminal 41 at the time $t_1$ and does not condut until the potential at that point has decayed to its normal value as at time $t_4$. Therefore, during the period between times $t_1$ and $t_4$ the transistor $T_3$ is off or non-conducting and this in turn causes transistor $T_4$ to go to the non-conducting condition as a result of the biases $E_6$ connected to terminal 46 and $E_2$ connected to terminal 62.

Since transistor $T_4$ is non-conducting during the period between $t_1$ and $t_4$, the transistor $T_5$ will also be non-conducting during that period due to the biases thereon, namely, $E_2$ at terminal 62, $E_3$ at terminal 74 and $E_3$ at terminal 69. Non-conduction of transistor $T_5$, of course, causes the output at terminal 75, namely output "A," to go to a zero potential as indicated in FIGURE 2 between the time periods $t_1$ and $t_4$. This time period represents the delay of the delay flop. At the time $t_4$, the capacitor 10 has discharged and the terminal 41 has returned to the potential which allows $T_3$ to be conductive thus, in turn, allowing both transistors $T_4$ and $T_5$ to be conductive and to again produce at output "A" a steady potential $+E_3$ as shown after the time $t_4$.

The feedback circuit including resistor 77 and capacitor 78 provide a feedback to the base 52 of the transistor $T_4$ which aids in the rapid changing of transistor $T_4$ from the conductive state to the non-conducting state and vice versa.

The resumption of conduction of the transistor $T_4$ at time $t_4$ causes changes in output "B" as noted in FIGURE 2.

Regarding output "B," it will be evident that transistor $T_6$ will be in the normally non-conductive state between the time periods $t_0$ and $t_4$, however, the return of transistor $T_4$ to a conductive state at $t_4$ causes the potential at the collector 60 to go to ground potential and the capacitor 86 is then charged up through the resistor 85 to the potential $+E_3$ of emitter 80 applied at terminal 82 at which time $T_6$ ceases to conduct. The conduction of transistor $T_6$ may thus only last for a short time depending upon the time constant established by the magnitude of the resistor 85 and the capacitor 86. It is generally desired that this be a short time in order to produce a pulse at the output "B" as shown in FIGURE 2. Output "B" is thus a pulse signalling the trailing edge of the pulse produced during the discharge of capacitor 10 at output "A."

Regarding the output "C" which appears at terminal 103, this may be considered to be a leading edge pulse since it appears at the leading edge of the pulse produced at output "A" during the discharge of capacitor 10. Transistor $T_7$, which is normally conductive, becomes non-conductive for a short time after transistor $T_4$ becomes non-conductive, namely after $t_1$. The negative-going pulse resulting from the non-conductive state of transistor $T_4$ appears at output terminal 103 as shown in FIGURE 2 and results from the discharging of the capacitor 99 through the resistor 100. Transistor $T_7$ is kept in the conducting state during that charging period. The potential at the output terminal 103 thus goes from a potential of approximately $+E_3$ to zero for a short time after the time $t_1$ depending upon the time period required for the charging of capacitor 99.

From the foregoing description it will be evident that an input pulse applied at terminal 13 at the time $t_1$ causes three different types of output signals at outputs "A," "B" and "C," terminals 75, 92 and 103, respectively. Outputs "A" and "B" occur after the time required for the discharge of the capacitor 10 through its discharging circuit comprising resistors $R_1$ and $R_2$ and output "C" occurs at the start of that period. The time period for the discharge of the capacitor 10 depends upon the capacity of the capacitor and the magnitude of the resistors $R_1$ and $R_2$ as long as the other components remain unchanged. A change in the magnitude of the resistor $R_2$ provides a fine adjustment for the delay which the circuit produces, and major changes in the time period of the delay are made by replacing the capacitor 10 with a capacitor of different value.

It is also evident that with the input circuit of the type shown in FIGURE 1 the charging current for the capacitor 10 is produced by the input circuit in response to an input signal, and this charging current itself is effective to maintain the input circuit conductive and to thus continue the charging current until the capacitor 10 has been fully charged. The circuit configuration of FIGURE 1, as described, allows replacement of the capacitor 10 with other capacitors of widely differing values; thus allowing a considerable change in the delays this delay flop may produce. The circuit is thus extremely flexible and can be used to perform a number of functions in digital computer circuits, for example. Another distinct advantage of the circuit of FIGURE 1 is the adaptability of the circuit to a reset of the delay period at any time after the capacitor has started to discharge or, in other words, at any time after the trailing edge 3 of the wave shape on the second line of FIGURE 2. The circuit shown in FIGURE 1, therefore, has considerable flexibility as to the period during which it may be reset by another input pulse being applied at terminal 13.

The timing diagrams of FIGURE 2 shown after the time $t_5$ illustrate the potentials at various points in the circuit as they will occur after repeated resetting of the delay flop by successive periodic input pulses applied at times $t_5$, $t_6$ and $t_7$ as shown on the top line of FIGURE 2. The potential at point 41 will essentially follow a similar series of changes as that shown between the times $t_1$ and $t_4$ with the exception that upon resetting, such as at time $t_6$, the transistors $T_1$ and $T_2$ will be made again conductive and the capacitor 10 again receives a charging current charging it to the maximum potential. The potential of terminal 41 then continues to follow the normal discharge curve until a subsequent input pulse occurs at time $t_7$ and again causes the transistors $T_1$ and $T_2$ to become conductive and charge the capacitor 10 back up to its maximum potential. After the time $t_7$, no further inputs are received and, therefore, the delay is allowed to time out and to produce the outputs "A" and "B" as shown at time $t_{10}$.

At the beginning of the series of input pulses, the output "C" produced a pulse as shown at time $t_5$. This pulse identifies the leading edge of the negative-going pulse between $t_5$ and $t_{10}$ at output "A".

The resettable character of the delay flop makes possible identification of the beginning and the end of the series of periodic pulses by producing outputs upon initially receiving an input signal and after a certain delay has occurred following the last input pulse. This characteristic makes the circuit useful for identifying the beginning and end of a group of pulses such as may be encountered in computer circuits. This delay flop can thus be used as a means for indicating the end of a series of timing pulses, for example.

A circuit of the type shown in FIGURE 1 may utilize components of the values shown in the following table which are exemplary only of one of the possible combinations of values which will produce the type of operation previously described. With the particular values listed, the delay time between the input and output would be approximately 600 milliseconds.

| Resistors: | Ohms |
|---|---|
| 17 | 50 |
| 24 | 820 |
| 28 | 2,800 |
| 38 | 10,000 |
| 50 | 2,000 |
| 54 | 8,200 |
| 61 | 1,000 |
| 66 | 2,800 |
| 77 | 80,000 |
| 85 | 200 |
| 89 | 5,600 |
| 93 | 10,000 |
| 98 | 6,800 |
| 100 | 1,000 |
| 104 | 10,000 |
| $R_1$ | 680,000 |
| $R_2$ | 100,000 |

| Capacitors: | Mfd. |
|---|---|
| 15 | .01 |
| 78 | .0001 |
| 86 | .01 |
| 99 | .01 |
| C | 10.0 |

| Bias source: | Volts |
|---|---|
| $-E_1$ | −1.5 |
| $+E_2$ | +20 |
| $-E_4$ | −108 |
| $+E_3$ | +16 |
| $+E_5$ | +3 |
| $-E_6$ | −10 |

| Transistors: | Type |
|---|---|
| $T_1$ | 2N440 |
| $T_2$ | 2N428 |
| $T_3$ | 2N327A |
| $T_4$ | 2N440 |
| $T_5$ | 2N428 |
| $T_6$ | 2N428 |
| $T_7$ | 2N428 |

| Inductors: | Mh. |
|---|---|
| 16 | .5 |

| Diodes: | Type |
|---|---|
| 39 | 1N48A |
| 76 | S 183 (Transistron) |

There are many possible variations of both the input circuit 11 and the output circuits shown in FIGURE 1, and it will be evident to those skilled in the art that various changes in these circuits may be made utilizing the principle of operation described with regard to FIGURE 1. One example of an input circuit which may be substituted for input circuit 11, as shown in FIGURE 1, is that shown in FIGURE 3, wherein the transistors utilized are both of a PNP type from which faster operation may be obtained.

Figure 3:
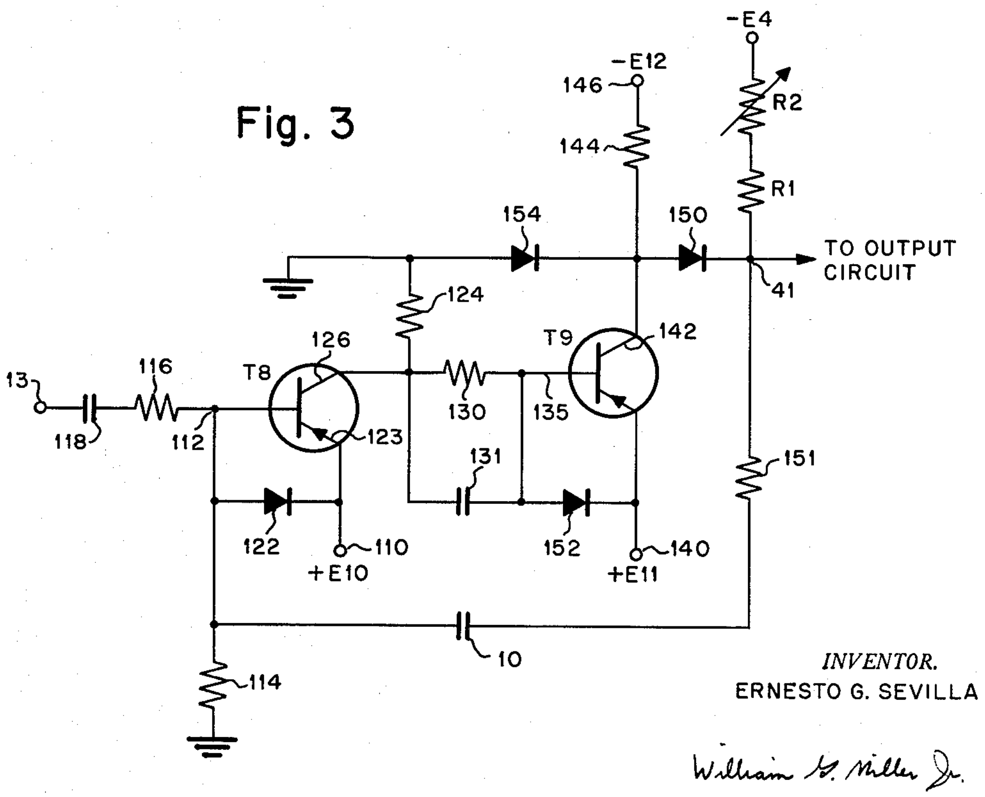
FIGURE 3 is a circuit diagram of another input circuit for a resettable delay flop such as is shown in FIGURE 1.

Referring to FIGURE 3, the transistor $T_8$ is in a normally conductive condition as a result of the bias $+E_{10}$ at the emitter terminal 110 and the connection of the base 112 to ground through resistor 114. The base 112 is also connected through resistor 116 and capacitor 118 to an input terminal 13 at which the input pulses are received. The base 112 is likewise coupled to the emitter via diode 122 having its anode connected to the base 112 and its cathode connected to the emitter 123 of transistor $T_8$. The normally conductive state of transistor $T_8$ provides a current through the resistor 124 which is coupled to collector 126 of the transistor. There is likewise conduction through the parallel combination of resistor 130 and capacitor 131 from the collector 126 to the base 135 of transistor $T_9$. This conduction maintains the transistor $T_9$ in a normally non-conducting state as a result of the bias potential $+E_{11}$ on emitter terminal 140 being less than the potential appearing at base 135 as a result of the conduction of transistor $T_8$. In addition to being connected to the bias $+E_{11}$ at terminal 140, the transistor $T_9$ has its collector 142 connected through resistor 144 to a bias potential $-E_{12}$ at terminal 146. Therefore, upon application of an input pulse at input point 120, the transistor $T_8$ is biased to an off or non-conducting condition and the bias of transistor $T_9$, which kept it in a normally off or non-conducting condition, is removed and transistor $T_9$ starts to conduct. Conduction of transistor $T_9$ produces a current through the diode 150 which in turn flows through resistor 151 and capacitor 10 to act as a charging current for charging up capacitor 10. This charging current will tend to maintain the transistor $T_8$ in a non-conducting state thus maintaining transistor $T_9$ in a conductive state and continuing the supply of charging current until the charge on the capacitor reaches a value sufficient to cut off diode 150. Upon reaching sufficient charge for the cut off of diode 150, the capacitor will then discharge through the resistors $R_1$ and $R_2$ as was the case with the circuit of FIGURE 1. The capacitor discharging through these resistors causes terminal 41 to return back to its normal potential after the predetermined delay establishes for capacitor 10 and resistors $R_1$ and $R_2$. Transistor $T_8$ then returns to the conducting state.

The rectifiers 122 and 152 are connected in circuit with transistors $T_8$ and $T_9$, respectively, to protect the transistors from overloading. There is also a diode 154 connected between ground and the junction between resistor 144 and the collector 142 of transistor $T_9$. This diode serves to maintain the collector 142 of transistor $T_9$ at a ground potential when transistor $T_9$ is non-conducting.

One possible set of values for the components of the circuit of FIGURE 3 to produce a delay time of approximately 30 milliseconds is a follows:

| Resistors: | Ohms |
|---|---|
| 116 | 1,000 |
| 114 | 10,000 |
| 124 | 2,000 |
| 130 | 1,000 |
| 144 | 8,200 |
| 151 | 390 |
| $R_1$ | 680,000 |
| $R_2$ | 100,000 |

| Transistors: | Type |
|---|---|
| $T_8$ and $T_9$ | 2N504 |

| Capacitors: | | Value |
|---|---|---|
| 118 | $\mu$f | 0.01 |
| 131 | $\mu\mu$f | 330 |
| C | $\mu$f | 0.5 |

| Bias potential sources: | Volts |
|---|---|
| $+E_{10}$ | +18 |
| $+E_{11}$ | +16 |
| $-E_{12}$ | −10 |
| $-E_4$ | −108 |

| Diodes: | Type |
|---|---|
| 122 | S183 |
| 152 | S183 |
| 154 | S183 |
| 150 | 1N484A |

From the foregoing, it will be seen that transistors $T_8$ and $T_9$ are in conductive and non-conductive states, respectively, in the absence of an input signal 13, whereas the presence of an input pulse at the terminal 13 causes the transistor $T_8$ to be non-conducting and transistor $T_9$ to be conducting. While in the conducting state, transistor $T_9$ supplies the charging current for the capacitor 10. This charging current maintains the transistor $T_8$ in a non-conducting state until the capacitor 10 has been fully charged at which time the transistors revert to their normal states, namely $T_8$ conducting and $T_9$ non-conducting. The terminal 41 in FIGURE 2 may be connected to output circuits, such as shown in FIGURE 1, including transistors $T_3$–$T_7$ and associated circuitry. Other similar output circuits may be utilized to provide any of a number of desired output signals in response to both the initiation and termination of the preset delay determined by the capacitor 10 and the discharging resistors $R_1$ and $R_2$.

What is claimed is:

1. A delay flop comprising a source of trigger pulses, an input circuit, a capacitor connected in positive feedback relationship to said input circuit for charging therefrom, means coupling said source to said input circuit, said input circuit including means responsive to the current charging said capacitor to continue charging current flow from said input circuit to said capacitor after termination of said trigger pulse and for terminating said charging when said capacitor has attained a certain charge, a circuit for discharging said capacitor after it has become charged, and output circuit means responsive to the charge on said capacitor for producing an output signal therefrom upon discharge of said capacitor for a predetermined time.

2. A delay circuit comprising an input circuit for producing a charging current in response to an input signal, a capacitor, means connecting said capacitor in a feedback circuit with said input circuit so that said capacitor receives said charging current from said input circuit, the feedback of said charging current to said input circuit being effective to maintain said charging current by said input circuit after the termination of said input signal, means operable in response to the charge on said capacitor reaching a predetermined level to terminate said charging current and discharge said capacitor, and means for producing an output signal in response to the discharge of said capacitor.

3. A resettable delay flop comprising a normally nonconductive input amplifier, a source of input signals, said input signals being of magnitude and polarity to cause said input amplifier to become conductive, a capacitor in feedback connection between the output and input of said input amplifier, said capacitor receiving a charging current from said input amplifier during conduction of said input amplifier and said charging current being effective to maintain said input amplifier in said conductive state until the charge in said capacitor reaches a predetermined value such that the said charging current decreases to a value preventing further conduction of said input amplifier, a discharge circuit for dissipating the charge on said capacitor at a predetermined rate during the non-conductive state of said input amplifier, a first output circuit responsive to the charge on said capacitor for producing a signal of duration corresponding to the period of charging and discharging of said capacitor, a second output circuit responsive to the charge on said capacitor for producing a pulse output during any charging of said capacitor following its discharge to said predetermined value, and a third output circuit responsive to the charge on said capacitor for producing a pulse output upon discharge of said capacitor to said predetermined value.

4. In a resettable delay flop, a capacitor, an input circuit connected to said capacitor for providing a charging current for said capacitor in response to application of a signal to said input, means connecting said capacitor in positive feedback circuit relationship to said input circuit so that said charging current continues to flow through said capacitor whenever said input circuit is conductive and until said capacitor has a first predetermined charge, a discharge circuit for said capacitor operable to discharge said capacitor from said first predetermined charge to a second predetermined charge in a certain time period, said input circuit and said feedback circuit being responsive to application of another signal to said input during the period of said discharge to recharge said capacitor to said first predetermined charge establishing the start of another discharge period, and output means connected to said capacitor and responsive to the establishment of said second predetermined charge on said capacitor to produce an output signal indicative of the end of the discharge period following the last signal applied to said input.

5. A resettable delay flop comprising an input circuit, said input circuit including a first transistor amplifier biased so that an input signal thereto establishes a conductive state producing an output signal, means connecting the output of said first transistor amplifier to the input of a second transistor amplifier, said second transistor amplifier being biased so that said output signal from said first amplifier produces an output signal from said second amplifier, a feedback circuit for providing a positive feedback between the output of said second amplifier and the input of said first amplifier, said feedback circuit including a capacitor and being effective to continue the production of an output signal from said second transistor amplifier in response to the flow of capacitor charging current in said feedback circuit, a diode interposed between the output of said second transistor amplifier and said capacitor so that establishment of a predetermined charge on said capacitor cuts off said diode and stops the flow of charging current to cut off the output signal from said first amplifier, a circuit for discharging said capacitor to another predetermined charge upon termination of said charging current, and an output circuit coupled to said capacitor operable to produce an output signal in response to said capacitor assuming said other predetermined charge.

6. A resettable delay flop as set forth in claim 5 in which said output circuit includes third and fourth transistor amplifiers with the output of said third amplifier being connected to the input of said fourth amplifier, said third and fourth amplifiers being biased to produce an output signal during the period when said capacitor is charged above said other predetermined charge, said output circuit also including a fifth transistor amplifier having a capacitive coupling to the output of said fourth amplifier so that said capacitive coupling becomes charged by the output of said fourth amplifier to produce a pulse indicative of the establishment of said other charge on said capacitor, and a sixth transistor amplifier capacitively coupled to the output of said fourth amplifier so that said last-named capacitive coupling becomes charged by the output of said fourth amplifier to produce a pulse output indicative of the increase in the charge of said capacitor from said other charge.

References Cited in the file of this patent

UNITED STATES PATENTS

| | | |
|---|---|---|
| 2,541,039 | Cole | Feb. 13, 1951 |
| 2,636,983 | Poole | Apr. 28, 1953 |
| 2,898,481 | Gahwiler | Aug. 4, 1959 |
| 2,929,939 | Ingham | Mar. 22, 1960 |
| 3,002,109 | Baird | Sept. 26, 1961 |